United States Patent
Grandin

(10) Patent No.: US 7,320,190 B2
(45) Date of Patent: Jan. 22, 2008

(54) ARTICLE OF FOOTWEAR HAVING AN AT LEAST PARTIALLY COMPOSITE STRUCTURE

(75) Inventor: Giorgio Grandin, Trevignano (IT)

(73) Assignee: Tecnica SpA, Treviso (IT)

( * ) Notice: Subject to any disclaimer, the term of this patent is extended or adjusted under 35 U.S.C. 154(b) by 176 days.

(21) Appl. No.: 10/760,526

(22) Filed: Jan. 21, 2004

(65) Prior Publication Data

US 2004/0148807 A1    Aug. 5, 2004

(30) Foreign Application Priority Data

Feb. 5, 2003    (IT)    ............................ TV2003A0017

(51) Int. Cl.
*A43B 23/00* (2006.01)
*A43B 5/04* (2006.01)

(52) U.S. Cl. .................... 36/117.1; 36/45; 36/117.6; 36/115

(58) Field of Classification Search ............... 36/117.1, 36/117.6, 115, 45, 92, 89, 43, 30 R
See application file for complete search history.

(56) References Cited

U.S. PATENT DOCUMENTS

| | | | |
|---|---|---|---|
| 3,718,994 A | 3/1973 | Spier | |
| 3,950,483 A | 4/1976 | Spier | |
| 3,958,291 A | 5/1976 | Spier | |
| 4,050,108 A | 9/1977 | Londner et al. | |
| 4,096,650 A * | 6/1978 | Seidel | ..................... 36/118.2 |
| 4,551,930 A * | 11/1985 | Graham et al. | ............. 36/30 R |
| 4,561,195 A * | 12/1985 | Onoda et al. | ............... 36/30 R |
| 4,798,010 A * | 1/1989 | Sugiyama | ................... 36/30 R |
| 5,528,841 A * | 6/1996 | Pozzobon | ..................... 36/3 A |
| 5,667,737 A * | 9/1997 | Wittmann | .................. 264/40.1 |
| 6,340,164 B1 | 1/2002 | Borel et al. | |
| 6,401,365 B2 * | 6/2002 | Kita et al. | ...................... 36/28 |
| 6,457,265 B1 * | 10/2002 | Lepage et al. | ............. 36/117.1 |

FOREIGN PATENT DOCUMENTS

FR    2 671 947    1/1992
FR    2766065    7/1992

* cited by examiner

*Primary Examiner*—Jila M Mohandesi
(74) *Attorney, Agent, or Firm*—Birch, Stewart, Kolasch & Birch, LLP

(57) ABSTRACT

An article of footwear comprises a shell (10) and preferably also a leg piece (20), and features, at least at some portions thereof that do not include the sole (15), a composite structure formed of two layers (30, 40; 30A, 40A) that are made of preferably synthetic materials having different mechanical properties. At least the interfacing surface (34, 34A) of the layer (30) made of mechanically stronger materials is provided with protruding elements (36) that remain inseparably adhering to the interfacing surface (42, 42A) of the other layer (40).

8 Claims, 1 Drawing Sheet

ARTICLE OF FOOTWEAR HAVING AN AT LEAST PARTIALLY COMPOSITE STRUCTURE

This Non-provisional application claims priority under 35 U.S.C. § 119(a) on Patent Application No(s). TV 2003 A 000017 filed in Italy on Feb. 5, 2003, the entire contents of which are hereby incorporated by reference.

The present invention refers to articles of footwear of the type that is normally subject to particularly demanding and severe mechanical stresses under the specific conditions of use thereof.

Examples of articles of footwear of the above-cited type include ski boots, in-line skate boots, as well as boots used in generally demanding, awkward working environments, such as open-air building yards, just to name a few. The construction of such articles of footwear calls for the use of a shell and an leg piece that are made of thermoplastic or thermosetting synthetic materials by such techniques as injection moulding and/or casting. In some cases, shell and leg piece are made as a single-piece construction, i.e. integral with each other; however, in the majority of cases, shell and leg piece are provided as separate pieces joined with the use of articulated connecting means.

From a wearer's point of view, these articles of footwear are required to comply with three basic conditions: they must first of all enable the sports or working activity to be carried out in the best possible manner; they shall further protect the feet against any possible risk deriving from the particular conditions of use; finally, they shall ensure a maximum extent of comfort. For instance, ski boots are required to remain as much as possible adhering to the feet in order to enable the skis to be steered in a desirably effective manner; to withstand the huge, most diversified stresses typically encountered when racing along ski slopes and to protect the feet by guarding them against injuries that might be incurred when possibly bumping against such obstacles as may quite easily be encountered both within and outside a slope, and finally to be capable of keeping the feet adequately warm even in the presence of quite low ambient temperatures.

In almost the totality of the currently used and marketed ski boots, the shell and the leg piece are therefore manufactured by such techniques as injection moulding or casting of synthetic materials that have high mechanical properties in terms of strength and hardness and are therefore quite expensive. The utilization of materials which are less expensive and of a lower-grade is practically made impossible by the fact that big material thicknesses should in this case be used in compensation, with a resulting serious penalty of the wearer's comfort, for instance during walking. Similarly, selecting a structure of the shell, and possibly even of the leg piece, featuring areas of a bigger thickness only where such parts of the boots are actually subject to the most critical stresses, is made an impracticable option by both the moulding difficulties that would arise and the fact that the way in which the boot would look out with its basically uneven surface is fully unacceptable from both an aesthetical and an aerodynamic point of view.

A structure of both the shell and the leg piece has been proposed that consists of two layers, in which a first synthetic (softer) material forms the inner layer and one or more other synthetic materials (having higher mechanical-strength and hardness properties) form the outer layer, the latter being laid over the inner layer, wherein the thickness of each layer is uniform all over the boot—see document FR-A-2 671 947.

This proposal, however, does not seem to have been very successful on the marketplace, most probably due to the fact that it is capable of only partially comply with the basic requirements that, as indicated above, a boot of the considered type is called to meet.

It is also known from U.S. Pat. Nos. 4,551,930 to Graham et al., 4,561,195 to Onoda et al., 4,798,010 to Sugiyama, and U.S. Pat. No. 6,401,365 to Kita et al. to make at least a part of the midsole of a running shoe with two layers of materials having different mechanical properties in order to obtain either a greater flexibility or absorb shocks. It is also known from U.S. Pat. No. 5,528,841 to Pozzobon to provide in the shell of a footwear a plurality of through seats and a plurality of soft pads arranged within the seats. It is also known from U.S. Pat. No. 6,457,265 to Lepage et al. to make a boot having a rigid core and a supple envelope, wherein the rigid core has a reinforcement means extending through to the outside of the envelope.

It therefore is a main aim of the present invention to provide an article of footwear where the shell, and possibly also the leg piece, have a structure comprised of layers made of differentiated synthetic materials, which is optimised in order to fully comply not only with the above-mentioned basic wearer's requirements, but also with the basic requirements connected with mass-production needs, i.e. both strictly technical and economic requirements According to the present invention, this and further aims are reached in an article of footwear incorporating the characteristics as defined and recited in the appended claims.

In view of better illustrating the construction features of the article of footwear of the present invention, along with its advantages over the above-discussed prior art, the description of a preferred embodiment of the invention is given herebelow as a non-limiting example with reference to the ski boot illustrated in the accompanying drawings, in which.

Figure 1:
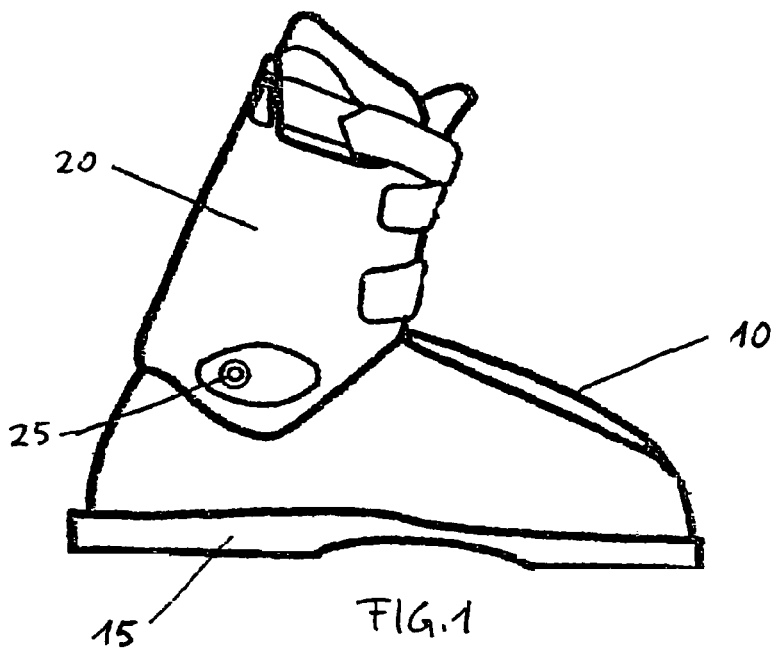
FIG. 1 is a simplified overall side view of the ski boot.

As shown in FIG. 1, a ski boot substantially consists of a shell 10 and a leg piece 20 that are joined with each other in an articulated manner through pivoting means 25 enabling the leg piece 20 to perform limited and controlled angular movements forwards with respect to the resting position thereof.

Figure 3:
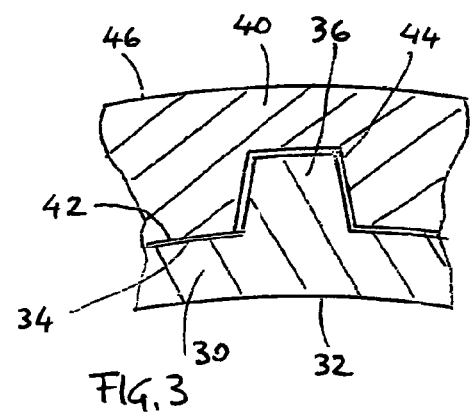
FIG. 3 is a cross-sectional view of the shell at such portion, along the plane III-III of FIG. 2.

According to the present invention at least a substantial part of the shell 10, with the exclusion of the sole 15, and possibly even of the leg piece 20, features a composite structure. This composite structure consists of a first layer 30 and a second layer 40, the latter being laid over and inseparably coupled with said first layer 30 at the respective interfacing surfaces 34, 42, however without any layer extending anywhere through the entire thickness of the other layer, as this shall be explained in greater detail further on with reference to FIGS. 3 and 4.

Figure 2:
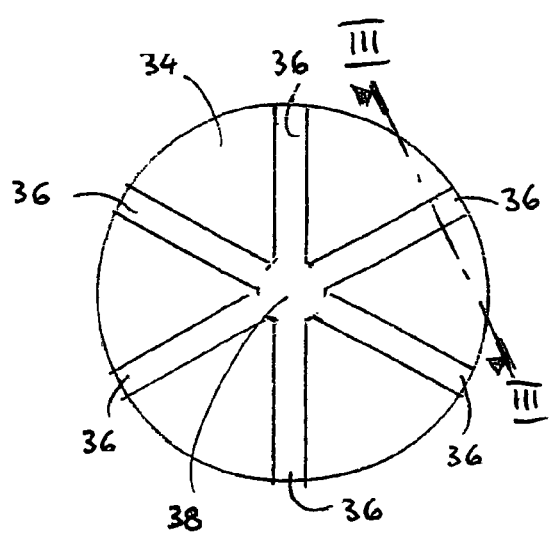
FIG. 2 is a front view of a portion of the shell of the boot which has the composite structure of the present invention.

The first layer 30 of the composite structure is made of materials featuring properties of high mechanical strength and hardness and, therefore, inherently expensive (preferably high-grade thermoplastic or thermosetting synthetic materials), and is characterized by the provision of stiffening ribs 36 protruding from the first surface 34 which is the surface of the first layer 30 that interfaces with the second layer 40, as already mentioned here above. In a preferred embodiment of the present invention, said stiffening ribs 36 intersect each other in such a manner as to constitute a type of truss-like pattern comprising knots 38 and formed integrally with a plate, as this is shown in FIG. 2. The second surface 32 of the first layer 30 is on the contrary uniform, i.e. substantially smooth and even.

In turn, the second layer 40 is made of softer and lower-grade synthetic (thermoplastic or thermosetting) materials, i.e. materials being of lower mechanical properties, then also of an inherently low-cost, than the materials used for the first layer 30. On the surface 42 of the second layer 40 interfacing with the first layer 30, there are provided recesses 44 corresponding to the shape and size of the stiffening ribs 36, as well as—in the already mentioned preferred embodiment—of the knots 38 of the truss-like pattern. The second surface 46 of the second layer 40 is on the contrary uniform, i.e. substantially smooth and even. The clearance that is visible in FIG. 3 between the interface surfaces 34 and 42 of the layers 30 and 40, including the clearance between the ribs 36 and the corresponding recesses 44, does not exist actually, since the interface surfaces 34 and 42 are inseparably adhering onto each other. Said clearance is only shown in FIG. 3 in view of making it simpler and easier to understand this explanation. As a matter of fact, the most suitable techniques that can be used to produce the composite structure of the invention include the well-known overinjection and/or co-injection moulding techniques, or even the two-step casting technique.

The aim of the ribs 36, especially if they are made so as to form a type of truss-like pattern, and therefore practically also the main advantage of the present invention, is to achieve a maximum extent of mechanical strength with an overall thickness S that is smaller than or, at most, equal to the thickness of a boots of a conventional structure.

As a principle, it does not really matter whether the first layer 30 faces inwards or outwards relative to the boot, i.e. is placed inwardly or outwardly, provided that the height H of the ribs, and therefore the moment of inertia of the structure of the boot with respect to the neutral axis, is accordingly sized in a different manner with respect to the overall thickness $S_1$. Anyway, it is generally preferable that, owing to its being made of a softer material, in contact with the foot of the wearer there should be the second layer 40.

In all cases, on the outside of the boot there appears a uniform, smooth surface, which either consists of the second surface 32 of the first layer 30 or of the second surface 42 of the second layer 40, so that there are no unfavourable consequences or effects on the aerodynamics of the boot and there is nothing for the snow to catch hold of. Even the inward facing surface of the boot, i.e. the one that is more or less directly in contact with the foot, is uniform and smooth, so that it cannot give rise to or be the cause of uneasy or, still worse, painful sensations to the wearer.

In the particular case that the first layer 30 (i.e. the layer provided with the ribs 36) is the one facing inwards inside the boot, a preferred embodiment of the present invention calls for a substantially transparent material to be used for the second layer 40. In this manner, when selecting a new pair of ski boots, a buyer is fully capable of realizing and appreciating the inherent robustness of the footwear which is due to the ribs 36, even in the case that the thickness S of the boots is relatively small as compared to other competing and conventional products on the market.

The portions where the composite structure characterizing the present invention is provided are at least those portions or areas of the boot which are subject to the most severe and demanding mechanical stresses during the use thereof. However, in view of simplifying the design of the required manufacturing tools (moulds), as well as the related manufacturing process, this composite structure can actually be used throughout the boot, i.e. all over both the shell 10 and the leg piece 20, with the exception of the sole 15.

Figure 4:
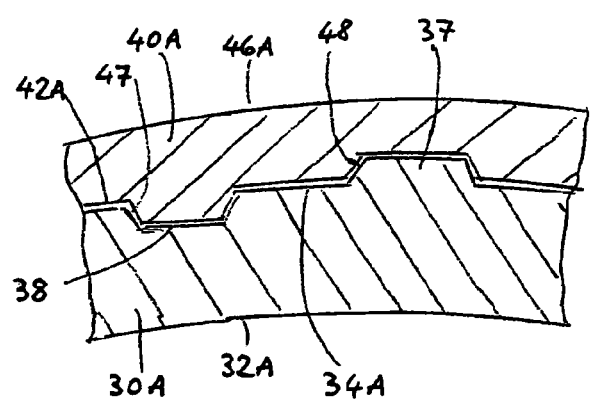
FIG. 4 is a cross-sectional view of a variant of the detail shown in FIG. 3.

According to a variant of the preferred embodiment of the present invention, illustrated in FIG. 4, the interfacing surfaces 34A and 42A of the first layer 30A and the second layer 40A respectively may be so shaped as to form—only at a few portions thereof—a number of protruding or positive relief elements 37, 47 and/or recessed or negative relief elements 38, 48, which may be so arranged as to form inscriptions, images, logotypes or the like, which are visible and readable by the users. In this case, a clear material must anyway be used for the layer 40A arranged on the outer side of the boot. The possibility is also given—as far as at least some of the above-mentioned relief elements are concerned, if not the entire surface on which they are provided—for specially coloured and/or luminescent materials and/or colouring treatments to be used in view of making said inscriptions, images, logotypes and the like more easily visible.

The advantages of the present invention which derive from the preceding description may be summarized as follows:

the structure of the entire article of footwear, or at least the structure of the shell thereof, is optimised from both a technical and production point of view and an economical point of view, since the higher-grade, more expensive material is only used to make the ribs provided to ensure the required mechanical strength of the boot by increasing the moment of inertia of the section without increasing the thickness with respect to a comparable article of footwear of a conventional construction;

owing to the two layers being laid upon each other, and not juxtaposed, there are not seams, but surfaces interfacing the different materials with each other, and this actually prevents any layer from separating from the other one;

the above-cited stiffening ribs do not affect the comfort of the footwear at all;

the above-cited stiffening ribs do not affect the aerodynamics of the boot, either (and this is a decisive factor if the article of footwear concerned is a boot used for ski racing), and do not even hold the snow on the outer surface of the boot;

the possibility for clear materials to be used to make the outer layer of the footwear provides a number of design and aesthetical options that may prove appealing and attractive to the consumers, since ribs, inscriptions, images, logotypes and the like layer are made readily visible, especially if coloured or luminescent materials or treatment are used to make such aesthetical options more conspicuous.

Although a preferred embodiment has been described here above, it will be appreciated that the invention may be implemented also in a number of different forms and variants without departing from the scope as defined by the appended claims. In particular, the increase of the moment of inertia without increasing the thickness of the shell can be obtained with the ribs of the protruding elements in selected locations of the interfacing surface of the layer made of materials with higher mechanical properties.

The invention claimed is:

1. An article of footwear comprising a sole and a shell of a composite structure at least in selected locations other than the sole, the composite structure being formed of a first layer and a second layer laid over and inseparably coupled with said first layer at respective interfacing surfaces, said first and second layers being made of materials having different mechanical properties wherein the layer made of materials with higher mechanical properties is provided with protruding elements that remain inseparably adhering to the interfacing surface of the other layer, which covers the protruding elements and entirely fills their interspace, at least a part of said protruding elements are ribs integral with the layer for stiffening selected locations of lateral and upper portions of the footwear, other than the sole of the footwear, said ribs extending radially and intersecting each other at points to form knots and thus form a truss-like pattern comprising a plurality of knots over a plate, while the outermost and innermost surfaces of the shell are uniform and substantially smooth, and wherein at least the layer arranged on the outward facing side of the shell is made of a clear material.

2. An article of footwear according to claim 1, wherein the layer made of materials with lower mechanical properties is softer and is the one coming directly or indirectly in contact with the foot of the wearer.

3. An article of footwear according to claim 1, wherein said ribs provide stiffening through an increase of the moment of inertia of said composite structure with respect to a neutral axis, and are projecting from the interface surface of the same layer with no increase in the thickness of the shell.

4. An article of footwear according to claim 1, wherein said some of said protruding elements are so arranged to create inscriptions, images, logotypes or the like on the interface surface of at least one of said layers, and at least the layer arranged on the outward facing side of the footwear is made of a clear material.

5. An article of footwear according to claim 4, wherein at least the protruding elements forming said inscriptions, images, logotypes or the like are provided with a luminescent finishing effect and/or in a different color with respect to the layer arranged on the outward facing side of the footwear.

6. An article of footwear according to claim 1, further comprising a leg piece mounted to said shell, the leg piece being of a structure which is at least in selected locations said composite structure.

7. An article of footwear according to claim 1, wherein said material with higher mechanical properties is high-grade thermoplastic or thermosetting synthetic material.

8. An article of footwear according to claim 1, wherein the material of the other layer is lower grade thermoplastic or thermosetting synthetic material.

* * * * *